T. E. WILLIAMS.
PIPE COUPLING.
APPLICATION FILED DEC. 22, 1908.

931,171.

Patented Aug. 17, 1909.

Inventor
Thomas E. Williams.

Witnesses

UNITED STATES PATENT OFFICE.

THOMAS E. WILLIAMS, OF PUNXSUTAWNEY, PENNSYLVANIA.

PIPE-COUPLING.

No. 931,171.    Specification of Letters Patent.    Patented Aug. 17, 1909.

Application filed December 22, 1908. Serial No. 468,778.

*To all whom it may concern:*

Be it known that I, THOMAS E. WILLIAMS, a citizen of the United States, residing at Punxsutawney, in the county of Jefferson and State of Pennsylvania, have invented a new and useful Pipe-Coupling, of which the following is a specification.

It is the object of this invention to provide a device of the above mentioned class, which shall be inexpensive to manufacture, facile in operation, and devoid of complicated parts.

The drawings illustrate but one embodiment of the invention, and it is to be understood that changes falling within the scope of the appended claim, may be made without departing from the spirit of the invention.

Figure 1:
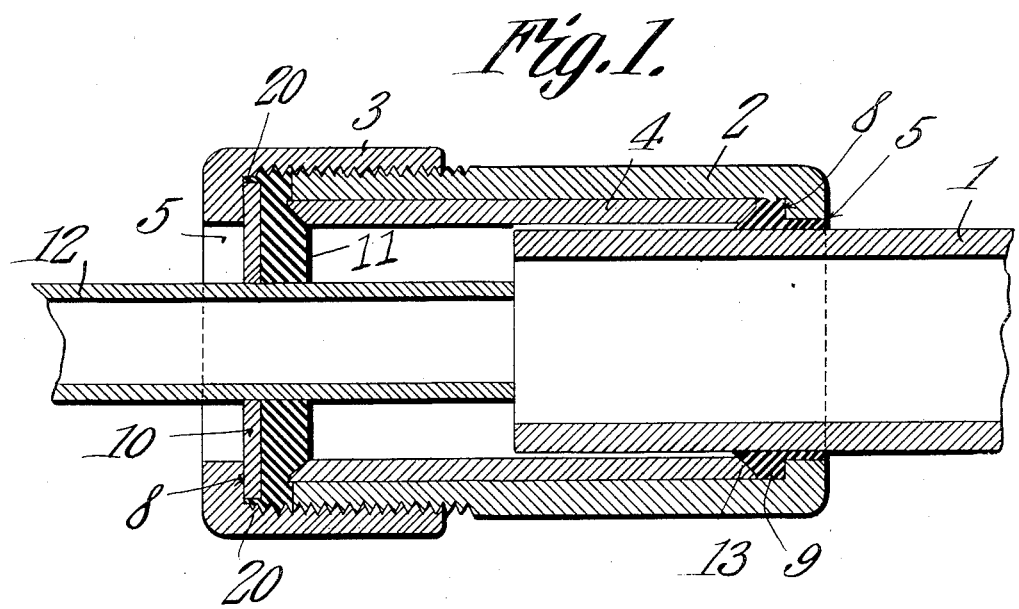
Figure 2:
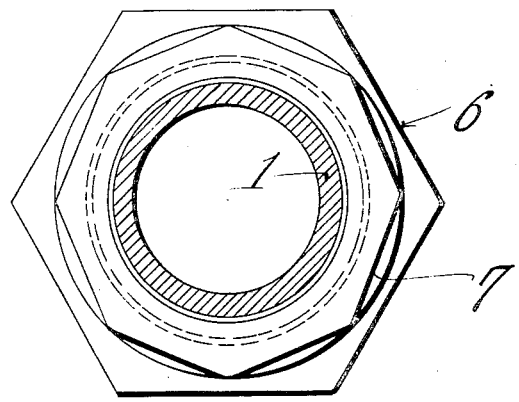

Figure 1 of the drawings is a longitudinal section of the device; and Fig. 2 is an end elevation thereof, one of the pipe members being sectioned.

In carrying out my invention I provide, primarily, a sleeve 2, threaded exteriorly at one of its terminals. A nut 3 is shown, interiorly threaded to engage the threaded terminal of the sleeve 2. Each of the elements 2 and 3 is provided with an axial opening 5 whereby shoulders 8 are formed, projecting into the interior of the device at the remote terminals of the nut and of the sleeve. The nut 3 is provided with a polygonal end 6, and the sleeve 2 with a polygonal end 7, in order that these members may be readily grasped or turned by a wrench.

Mounted within the members 2 and 3 is a bushing 4. The external diameter of this bushing is substantially the same as the internal diameter of the sleeve 2, and the internal diameter of the bushing is substantially the same as the diameter of the axial openings 5 of the members 2 and 3. Packing rings 9 and 11 are mounted in the members 2 and 3 respectively between the ends of the bushing 4 and the shoulders 8, the terminals of the bushing being cut away to form a sharpened edge, as denoted by the numeral 13.

The device is adapted to connect two pipes 1 and 12 of different diameters, and with this end in view I mount in the end of the nut 3, a washer 10, having a central opening of approximately the same diameter as that of the smaller pipe, the smaller pipe being denoted by the numeral 12. The packing ring which is disposed in the nut 3 is made somewhat thicker than the packing ring 9, the numeral 11 denoting a packing ring adapted for the purpose specified.

As shown in Fig. 1, the threads which circumscribe the interior of the nut 3, do not extend to the extreme end thereof, a portion of the interior of the nut, adjacent the shoulder 8 being left smooth as denoted by the numeral 20. The washer 10 fits loosely in this portion 20, and, when the ring 11 is split circumferentially by the beveled end of the bushing 4, and forced outwardly into the path of the end of the sleeve 2 and into the threads upon the interior of the nut 3, a portion of the ring will move freely and readily between the portion 20 of the interior wall of the nut and the periphery of the washer 10, securely binding the washer and hermetically sealing it in place, the packing ring 9 being compacted against the shoulder 8 of the sleeve 2 in the operation.

I claim:—

A coupling comprising an externally threaded sleeve and a nut internally threaded throughout a portion of its length to engage the sleeve, the sleeve and the nut being provided at their remote ends with inwardly projecting shoulders; a washer disposed in abutment with the shoulder of the nut and arranged to fit loosely in the nut adjacent the unthreaded portion thereof; a packing ring disposed in abutment with the washer, and a packing ring disposed in abutment with the shoulder of the sleeve; and a tubular bushing slidably mounted in the sleeve and arranged at one end to compact one of said packing rings against the shoulder of the sleeve, and at the other end arranged to split circumferentially, the other of said packing rings, intermediate its edges, to force a portion of said ring into the path of the end of the sleeve and into the threads of the nut, the end of the sleeve being arranged to force a portion of said packing ring between the unthreaded portion of the interior of the nut and the periphery of the washer.

In testimony that I claim the foregoing as my own, I have hereto affixed my signature in the presence of two witnesses.

THOMAS E. WILLIAMS.

Witnesses:
N. D. COREY,
WALTER E. STOUT.